United States Patent
Francois et al.

(10) Patent No.: US 10,701,360 B2
(45) Date of Patent: *Jun. 30, 2020

(54) METHOD AND DEVICE FOR DETERMINING THE VALUE OF A QUANTIZATION PARAMETER

(71) Applicant: CANON KABUSHIKI KAISHA, Tokyo (JP)

(72) Inventors: Edouard Francois, Bourg des Comptes (FR); Guillaume Laroche, Melesse (FR); Patrice Onno, Rennes (FR); Christophe Gisquet, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,691

(22) Filed: Aug. 7, 2018

(65) Prior Publication Data
US 2018/0352228 A1    Dec. 6, 2018

Related U.S. Application Data

(63) Continuation of application No. 14/782,301, filed as application No. PCT/EP2014/055863 on Mar. 24, 2014, now Pat. No. 10,075,714.

(30) Foreign Application Priority Data

Apr. 5, 2013 (GB) .................................. 1306214.6

(51) Int. Cl.
*H04N 19/124* (2014.01)
*H04N 19/162* (2014.01)
(Continued)

(52) U.S. Cl.
CPC ......... *H04N 19/124* (2014.11); *H04N 19/162* (2014.11); *H04N 19/17* (2014.11); *H04N 19/186* (2014.11); *H04N 19/463* (2014.11)

(58) Field of Classification Search
CPC .. H04N 19/124; H04N 19/126; H04N 19/186; H04N 19/61; H04N 19/176;
(Continued)

(56) References Cited

U.S. PATENT DOCUMENTS

2005/0271288 A1* 12/2005 Suzuki ................ H04N 11/044
382/239

OTHER PUBLICATIONS

Jun Xu, et al., Consideration on Chroma QP Range Extension for HEVC version 1 and 2, Joint Collaborative Team on Video Coding (JCT-VC) of ITU-T SG 16 WP 3 and ISO/IEC JTC 1/SC 29/WG 11, 10th Meeting, 6 pages, Document No. JCTVC-J0318_r1.

* cited by examiner

*Primary Examiner* — Leron Beck
*Assistant Examiner* — Samuel D Fereja
(74) *Attorney, Agent, or Firm* — ACnon U.S.A., Inc. IP Division

(57) ABSTRACT

The value of a quantization parameter for at least one second color component of an image or image portion is determined using a current color format among several possible color formats. The determination comprises the steps of selecting at least one function associated with a possible color format, and determining the value of the quantization parameter for the second color component by applying said at least one function to a value of an intermediate quantization parameter which is based on the value of the quantization parameter of the first color component of the image or image portion. The at least one function is selected independently from the current color format.

20 Claims, 4 Drawing Sheets

(51) Int. Cl.
*H04N 19/186* (2014.01)
*H04N 19/17* (2014.01)
*H04N 19/463* (2014.01)

(58) Field of Classification Search
CPC ...... H04N 19/70; H04N 19/136; H04N 19/46; H04N 19/44; H04N 19/184; H04N 19/11; H04N 19/122; H04N 19/172; H04N 19/105; H04N 11/044; H04N 19/119; H04N 19/593; H04N 19/13; H04N 19/159; H04N 19/174; H04N 19/86; H04N 19/147; H04N 19/117; H04N 19/18; H04N 19/187
See application file for complete search history.

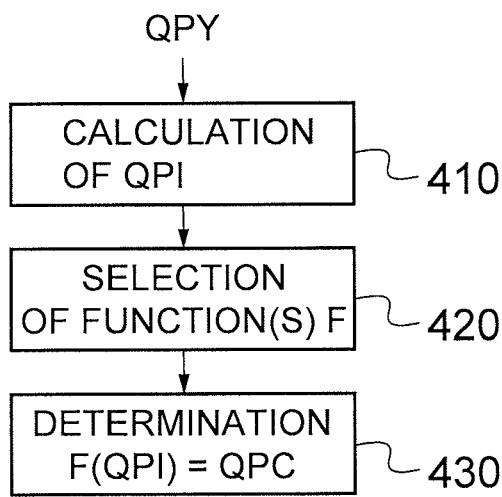
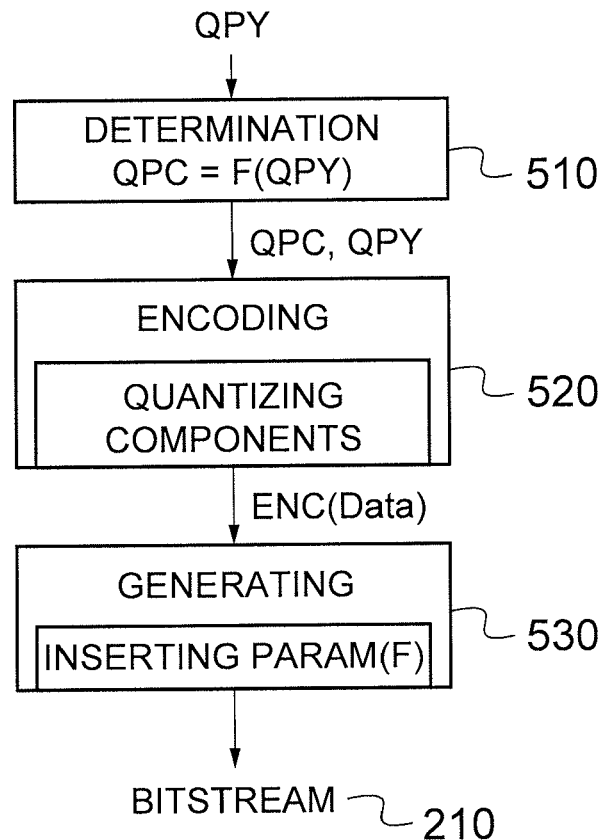
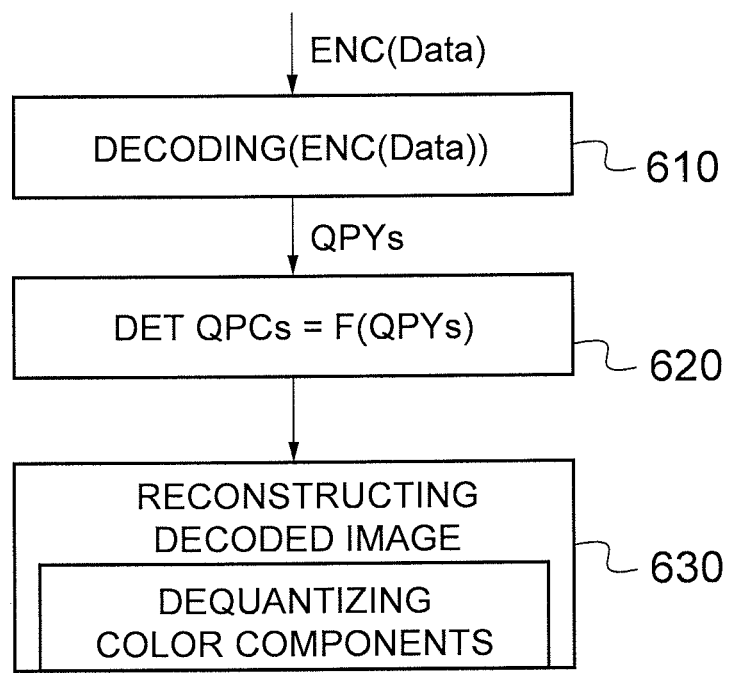

METHOD AND DEVICE FOR DETERMINING THE VALUE OF A QUANTIZATION PARAMETER

CROSS-REFERENCE TO RELATED APPLICATIONS

This application is a continuation of U.S. patent application Ser. No. 14/782,301, filed on Oct. 2, 2015, that is a National Phase application of PCT Application No. PCT/EP2014/055863, filed on Mar. 24, 2014 and titled "Method and device for determining the value of a quantization parameter." This application claims the benefit under 35 U.S.C. § 119(a)-(d) of United Kingdom Patent Application No. 1306214.6, filed on Apr. 5, 2013 and titled "Method and device for determining the value of a quantization parameter". The above cited patent applications are incorporated herein by reference in their entirety.

FIELD OF THE INVENTION

The present invention relates to a method and device for determining the value of a quantization parameter. Such a method and device can be used to provide an improvement of the joint quantization of the color components in the Range Extension (RExt) of the video standard HEVC (for "High Efficiency Video Coding").

BACKGROUND OF THE INVENTION

A color picture is generally made of three color components R, G and B. These components are generally correlated, and it is very common in image and video compression to decorrelate the color components prior to processing the pictures. To that purpose, the most common format used is the YUV color format (or another similar variant called YCbCr). YUV signals are typically created from RGB pictures, by using a linear transform of the three inputs R, G and B. In the YUV format, U and V are second color components and Y is the first color component. The three components are currently considered as color components.

The image or picture and in particular its color components are associated with quantization parameters QP (typically between 0 and 51) used in the quantization process of coefficients derived from pixel sample values by a transform (for instance the OCT or the DST), during the image encoding and in the dequantization process during the image encoding and decoding.

In the video standard HEVC, for example, there is a link between the quantization parameters QP applied to the first color component (which is the first color component in case of YUV color format, and can be for instance the G color component in case of RGB color format), hereafter denoted QPY, and the quantization parameters QP applied to the other color components called second color components (which are the second color components in case of YUV color format, and can be for instance the R and B color components in case of RGB color format), hereafter denoted QPC.

To generate QPC from QPY, an intermediate value QPI is calculated as follows:

$$QPI = \mathrm{MAX}(-QPBd\mathrm{OffsetC}, \mathrm{MIN}(57, QPY + QP\mathrm{OffsetC}))$$

Wherein:

QPBdOffsetC is a pre-defined offset depending on the bit-depth used to represent the second color component, and QPOffsetC is an offset that enables to partly control the link between QPY and QPC.

Then, the quantization parameter applied to the second component QPC is derived from the intermediate value QPI using for example one of the following correspondence tables (from the current draft of the Range Extension of HEVC) selected depending on the used color format (specified by a parameter ChromaArrayType):

TABLE 1

| | | | | | | | | | | | | | | | | | |
|---|---|---|---|---|---|---|---|---|---|---|---|---|---|---|---|---|---|
| 4:2:0 YUV color format | | | | | | | | | | | | | | | | | |
| ChromaArrayType = 1 (4:2:0 YUV colorformat) | QPI | <30 | 30 | 31 | 32 | 33 | 34 | 35 | 36 | 37 | 38 | 39 | 40 | 41 | 42 | 43 | >43 |
| | QPC | = QPI | 29 | 30 | 31 | 32 | 33 | 33 | 34 | 34 | 35 | 35 | 36 | 36 | 37 | 37 | = QPI − 6 |

TABLE 2

| | | | | | | | | | | | | | | | |
|---|---|---|---|---|---|---|---|---|---|---|---|---|---|---|---|
| 4:2:2 YUV color format | | | | | | | | | | | | | | | |
| ChromaArrayType = 2 (4:2:2 YUV colorformat) | QPI | <33 | 33 ≤ QPI < 39 | 39 | 40 | 41 | 42 | 43 | 44 | 45 | 46 | 47 | 48 | 49 | 50 | >50 |
| | QPC | = QPI | = (QPI − 1) | 37 | 38 | 39 | 40 | 40 | 41 | 42 | 42 | 43 | 44 | 44 | 45 | = QPI − 6 |

TABLE 3

| | | | |
|---|---|---|---|
| 4:4:4 YUV color format | | | |
| ChromaArrayType = 3 (4:4:4 YUV colorformat) | QPI | <51 | ≥51 |
| | QPC | = QPI | 51 |

Thus, these tables are used to obtain the quantization parameters of the second color component, each time in correlation with the color format used. In the first version of HEVC (the version issued before the Range Extension version), only the Table 1 is specified and used. In the current draft of Range Extension specification, the two additional tables (Table 2 and Table 3) have been added.

Even if they allow a generalization to several color formats, of the first version of the HEVC standard which was focused on the 4:2:0 YUV color format, there is no flexibility in the choice of the table since to one color format is associated one and a single table.

Furthermore, in order to allow the generalization of HEVC standard to the other color formats than 4:2:0 YUV, additional memory is required to store the values of Tables 2 and 3.

SUMMARY OF THE INVENTION

The present invention has been devised to address one or more of the foregoing concerns, with light of improving the flexibility of the quantization of first and second color components in the Range Extension of the video standard HEVC.

In this context and according to a first aspect of the invention, there is provided a method of determining the value of a quantization parameter for at least one second color component of an image or image portion, using a current color format among several possible color formats, the method comprising the following steps:
  selecting at least one function associated with a possible color format, and
  determining the value of the quantization parameter for the second color component by applying said at least one function to a value of an intermediate quantization parameter, the intermediate quantization parameter being based on the value of the quantization parameter of the first color component of the image or image portion,
  wherein the at least one function is selected independently from the current color format.

In some embodiments, the color format is a YUV color format, the first color component being a luma component and the at least one second color component being a chroma component.

According to the invention, said function is a table associating with each value of the intermediate quantization parameter, a value of the quantization parameter for the second color component.

In a preferred embodiment, the three possible formats are the 4:2:0 YUV color format, the 4:2:2 YUV color format and the 4:4:4 YUV color format and the two available functions are the following tables:

In some embodiments, there are exactly three possible color formats and there are only two available functions for determining quantization parameters for chroma components.

In some embodiments, the color format is a YUV color format, the first color component being a luma component and the at least one second color component being a chroma component.

In some embodiments, the value of the intermediate quantization parameter QPI is calculated using the following equation:

$$QPI=\text{MAX}(-QPBd\text{OffsetC},\text{MIN}(57,QPY+QP\text{OffsetC}))$$

wherein:
  QPBdOffsetC is a pre-defined offset depending on the bit-depth used to represent the second color component,
  QPY is the value of the quantization parameter of the first color component of the image or image portion, and
  QPOffsetC is an offset that enables to partly control the link between QPC and QPY.

According to another aspect of the invention, there is provided a method of encoding an image or image portion represented by a first color component and at least one corresponding second color component, said components being divided into coding units, which forms part of an image sequence, the method comprising:
  determining the value of a quantization parameter for at least one second color component as mentioned above,
  encoding the successive coding units into encoded data, the encoding comprising quantizing the first and at least one second color component of image or image portion by using the quantization parameters of first and second color components, and
  generating a bit stream of said encoded data.

In some embodiments, the generation step comprises inserting a parameter indicating the function used in the determination step, into a NAL unit of the bit stream.

In some embodiments, said NAL unit is a Sequence Parameter Set or a Picture Parameter Set.

In variants, said NAL unit comprises a slice and wherein said parameter is included into the header of the slice.

| Table associated with the 4:2:0 YUV color format | | | | | | | | | | | | | | | | |
|---|---|---|---|---|---|---|---|---|---|---|---|---|---|---|---|---|
| ChromaArray Type = 1 | QPI QPC | <30 = QPI | 30 29 | 31 30 | 32 31 | 33 32 | 34 33 | 35 33 | 36 34 | 37 34 | 38 35 | 39 35 | 40 36 | 41 36 | 42 37 | 43 37 | >43 = QPI − 6 |

| Table associated with the 4:4:4 YUV color format | | | |
|---|---|---|---|
| ChromaArrayType >1 | QPI QPC | <51 = QPI | 51 51 |

Since less functions than possible color formats are available, the additional memory required to store the values of the functions is limited in comparison with the prior art (see for example Table 2 of the introduction, which contains specific values that cannot be deduced from the other Tables).

Thus, even if there is no available function associated with the current color format, the determination of the value of the quantization parameter for the second color component can be handled, using the available functions.

In some embodiments, when the image is being filtered by a deblocking filter using at least one deblocking quantization parameter for the at least one second color component, the deblocking quantization parameter is determined by applying said at least one function to a value of another intermediate quantization parameter QPI' also based on the value of the quantization parameter of the luma component of the image or image portion.

For instance, the filtered image is the reconstructed image based on the quantized data. The filtered image may be used as a reference image for encoding another image.

In some embodiments, the image or image portion is divided into blocks, and wherein the value of the other intermediate quantization parameter QPI' is calculated using the following equation:

$$QPI'=QPY\text{pred}+cQp\text{PicOffset}$$

wherein:
cQpPicOffset is a pre-defined offset transmitted in the generated bit stream used to represent the quantization parameter for the at least one second color component; and QPYpred is an average deblocking quantization parameter value deduced from the neighbouring blocks of the current block being processed.

According to another aspect of the invention, there is provided a method of decoding an image or image portion, which forms part of an image sequence, the method comprising:
receiving encoded data related to the image or image portion to decode,
decoding the encoded data,
determining the value of quantization parameters for at least one second color component as mentioned above, and
reconstructing the decoded image or image portion from the decoded data, the reconstructing comprising dequantizing the first and at least one second color components of image or image portion by using the quantization parameters of first and second color components.

In some embodiments, the decoding method further comprises filtering the image or image portion with a deblocking filter using at least one deblocking quantization parameter for the or one chroma component, said deblocking quantization parameter being determined by applying said at least one function to a value of another intermediate quantization parameter QPI' also based on the value of the quantization parameter of the luma component of the image or image portion.

In some embodiments, the image or image portion is divided into blocks, and the value of the other intermediate quantization parameter QPI' is calculated using the following equation:

$$QPI'=QPYpred+cQpPicOffset$$

wherein:
cQpPicOffset is a pre-defined offset transmitted in the received bit stream used to represent the deblocking quantization parameter for the or chroma component; and QPYpred is an average deblocking quantization parameter value deduced from the neighbouring blocks of the current block being processed.

Correspondingly, there is also provided a device for determining the value of a quantization parameter for at least one second color component of an image or image portion, using a current color format among several possible color formats, the device comprising:
a module for selecting, independently from the current color format, at least one function associated with a possible color format, and
a module for determining the value of the quantization parameter for the second color component by applying said at least one function to a value of an intermediate quantization parameter, the intermediate quantization parameter being based on the value of the quantization parameter of the first color component of the image or image portion.

Correspondingly, there is also provided a device for determining the value of a quantization parameter for at least one second color component of an image or image portion, using a current color format among at least three possible color formats, a certain number of functions for determining quantization parameters for second color components being available, the number of available functions being lower than the number of possible color formats, the available functions being respectively associated with color formats different from the current color format, the device comprising a module for determining the value of the quantization parameter for the second color component by applying at least one available function to a value of an intermediate quantization parameter, the intermediate quantization parameter being based on the value of the quantization parameter of a first color component of the image or image portion.

Correspondingly, there is also provided a device for encoding an image or image portion represented by a first color component and at least one corresponding second color component, said components being divided into coding units, which forms part of an image sequence, the device comprising:
a device for determining the value of a quantization parameter for at least one second color component as mentioned above,
a module for encoding the successive coding units into encoded data, the encoding module comprising a module for quantizing the first and at least one second color component of image or image portion by using the quantization parameters of first and second color components, and a module for generating a bit stream of said encoded data.

Correspondingly, there is also provided a device for decoding an image or image portion, which forms part of an image sequence, the device comprising:
a module for receiving encoded data related to the image or image portion to decode,
a module for decoding the encoded data,
a device for determining the value of quantization parameters for at least one second color component as mentioned above, and
a module for reconstructing the decoded image or image portion from the decoded data, the reconstructing module comprising a module for dequantizing the first and at least one second color components of image or image portion by using the quantization parameters of first and second color components.

The devices may have similar optional features as the ones defined above in the methods dependent claims. Where a feature is described in terms of process above, one skilled in the art will be able to implement it as a functional element in the devices of the invention.

At least parts of the methods according to the invention may be computer implemented. Accordingly, the present invention may take the form of an entirely hardware embodiment, an entirely software embodiment or an embodiment combining software and hardware aspects which may all generally be referred to herein as a device or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 4 shows general steps of a method of determining the value of a quantization parameter for at least one second color component of an image, according to a particular embodiment of the invention;

FIG. 5 shows general steps of a method of encoding an image, according to a particular embodiment of the invention;

FIG. 6 shows general steps of a method of decoding an image, according to a particular embodiment of the invention.

DETAILED DESCRIPTION OF EMBODIMENTS OF THE INVENTION

The invention provides methods and devices for determining the value of a quantization parameter for a second color component.

Figure 1:
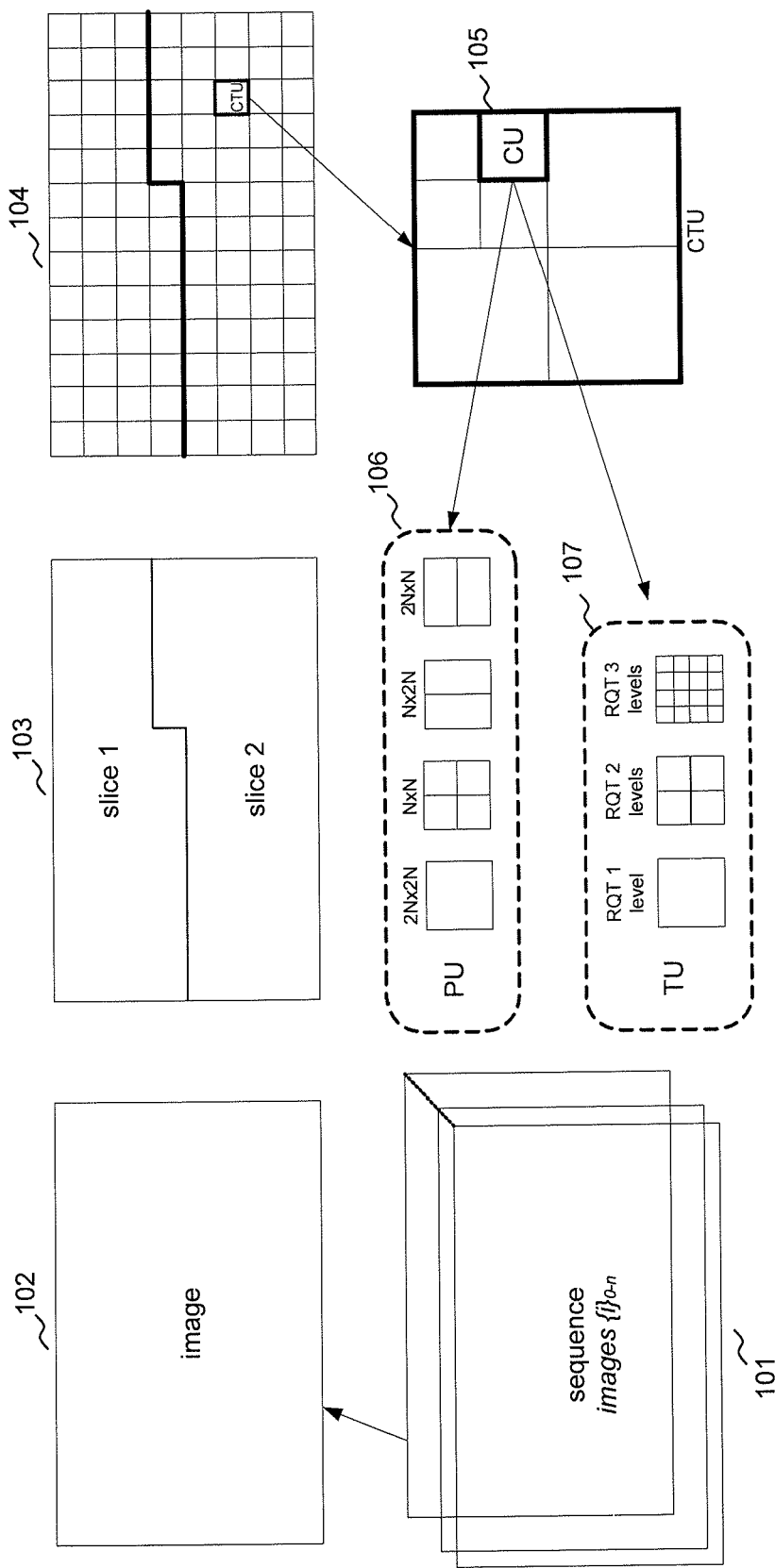
FIG. 1 illustrates the HEVC partitioning of an image.

FIG. 1 illustrates the HEVC partitioning of an image or picture made of three color components. For example, the first color component is a luma component Y and the other components are chroma components U, V.

In particular, FIG. 1 shows the coding structure used in HEVC, which is applicable to both the first version of HEVC and the Range Extension. According to HEVC and one of its previous predecessors, the original video sequence 101 is a succession of digital images "images i". As is known per se, a digital image is represented by one or more matrices, the coefficients of which represent pixels.

The images 102 are divided into slices 103. A slice is a part of the image or the entire image. In HEVC these slices are divided into non-overlapping Coding Tree Units (CTU) 104 (also called Largest Coding Units).

Each CTU 105 may be iteratively divided into smaller variable size Coding Units (CU) using a quadtree decomposition. Coding units CU are elementary coding elements, each comprising two sub units: Prediction Unit (PU) 106 and Transform Units (TU) 107 of maximum size equal to the CU's size.

Prediction Units correspond to the partition of the CU for prediction of pixels values. Each CU can be further partitioned into a maximum of four squares or two rectangles. Transform units are used to represent the elementary units that are spatially transformed (for instance with OCT or DST). A CU can be partitioned in TU based on a quadtree representation.

Each slice is embedded in one NAL unit. In addition, the coding parameters of the video sequence are stored in dedicated NAL units called parameter sets. In HEVC and H.264/AVC two kinds of parameter sets NAL units are employed:

Sequence Parameter Set (SPS) NAL unit that gathers all parameters that are unchanged during the whole video sequence; typically, it handles the coding profile, the size of the video frames and other parameters Picture Parameter Sets (PPS) NAL unit that codes the different values that may change from one frame to another.

Figure 2:
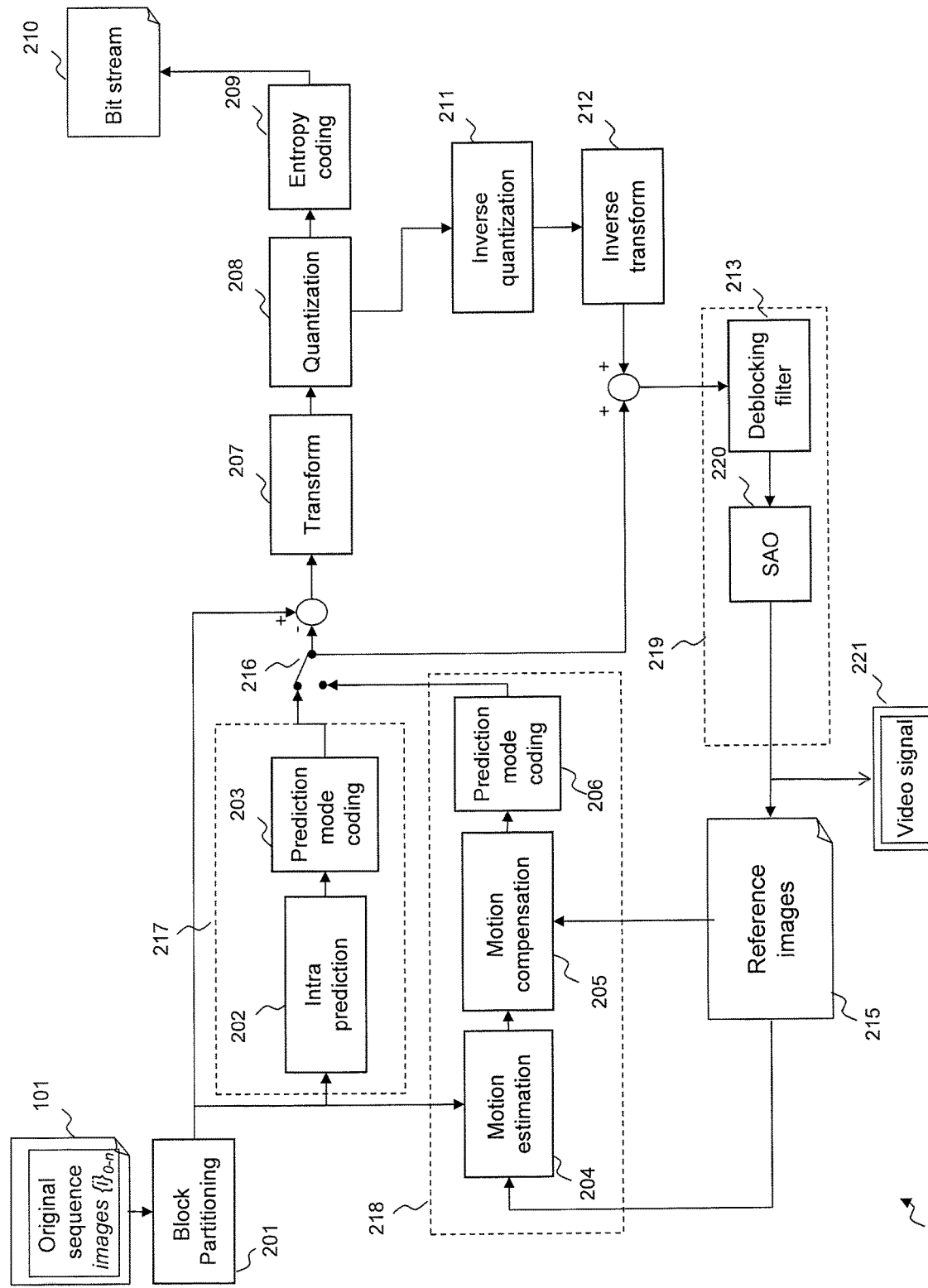
FIG. 2 shows a simplified block diagram showing an example of an encoding device according to one particular embodiment of the invention.

FIG. 2 shows a diagram of a classical HEVC video encoder 20 that can be considered as a superset of one of its predecessors (H.264/AVC). Such encoder can implement an encoding method according to embodiments of the present invention, as described later with reference to FIG. 5.

Each frame of the original video sequence 101 is first divided into a grid of coding units (CU) by the module 201. This step controls also the definition of coding and entropy slices. In general, two methods define slice boundaries that are: either use a fix number of CU per slices (entropy or coding slices) or a fix number of bytes.

The subdivision of the CTUs in CUs and the partitioning of the CUs in TUs and PUs is determined based on a rate distortion criterion. Each PU of the CUs being processed is predicted spatially by an "Intra" predictor 217, or temporally by an "Inter" predictor 218. Each predictor is a block of pixels issued from the same image or another image, from which a difference block (or "residual") is derived. Thanks to the identification of the predictor block and the coding of the residual, it is possible to reduce the quantity of information to be actually encoded.

The encoded frames are of two types: temporal predicted frames (either predicted from one reference frame called P-frames or predicted from two reference frames called B-frames) and non-temporal predicted frames (called Intra frames or !-frames). In I-frames, only Intra prediction is considered for coding CUs/PUs. In P-frames and B-frames, Intra and Inter prediction are considered for coding CUs/PUs.

In the Intra prediction processing module 217, the current block is predicted by means of an Intra predictor, a block of pixels constructed from the information already encoded of the current image. The module 202 determines a spatial prediction mode that is used to predict pixels from the neighbors PUs pixels. In HEVC, up to 35 modes are considered. A residual block is obtained by computing the difference of the intra predicted block and current block of pixels. An intra-predicted block is therefore composed of a prediction mode with a residual.

The coding of the intra prediction mode is inferred from the prediction mode of the neighbours prediction units. This inferring process of intra prediction mode performed by the module 203 permits to reduce the coding rate of the intra prediction mode. Intra prediction processing module uses also the spatial dependencies of the frame either for predicting the pixels but also to infer the intra prediction mode of the prediction unit.

The second processing module 218 performs Inter coding, using either Mono-prediction (P-type) or Bi-prediction (B-type). Mono-prediction (P-type) consists in predicting the block by referring to one reference block from one reference picture and Bi-prediction (B-type) consists in predicting the block by referring to two reference blocks from one or two reference pictures.

An estimation of motion between the current PU and reference images 215 is made by the module 204 in order to identify, into one or several of these reference images, one (P-type) or several (B-type) blocks of pixels, in order to use them as predictors of this current block. In case several block predictors are used (B-type), they are merged to generate one single prediction block. The reference images are images in the video sequence that have already been coded and then reconstructed (by decoding).

The reference block is identified in the reference frame by a motion vector that is equal to the displacement between the PU in current frame and the reference block. Next module 205 performs an inter prediction process consisting in computing the difference between the prediction block and current block. This block of difference is the residual of the inter predicted block. At the end of the inter prediction process the current PU is composed of one motion vector and a residual.

HEVC provides a method to predict the motion vectors of each PU. Several candidate motion vector predictors are employed. Typically, the motion vector of the PU localized on the top, the left or the top left corner of the current PU are a first set of spatial predictors. Temporal motion vector candidate is also used that is the one of the collocated PU (i.e. the PU at the same coordinate) in a reference frame. It selects one of the predictor based on a criterion that minimizes the difference between the MV predictor and the one of current PU. In HEVC, this process is referred as AMVP (stands for Adaptive Motion Vector Prediction).

Finally, current PU's motion vector is coded by the module 206 with an index that identifies the predictor within the set of candidates and a MV difference (MVD) of PU's MV with the selected MV candidate. Inter prediction processing module relies also on spatial dependencies between motion information of prediction units to increase the compression ratio of inter predicted coding units.

These two types of coding thus supply several texture residuals (the difference between the current block and the predictor block), which are compared in a module 216 for selecting the best coding mode.

The residual obtained at the end of inter or intra prediction process is then transformed by the module 207. The transform applies to a Transform Unit (TU) that is included into a CU. A TU can be further split into smaller TUs using a Residual QuadTree (RQT) decomposition 107. In HEVC, generally 2 or 3 levels of decompositions are used and authorized transform sizes are from 32×32, 16×16, 8×8 and 4×4. The transform basis is derived from a discrete cosine transform OCT or from a discrete sine transform DST.

The residual transformed coefficients are then quantized by module 208 using quantization parameters for first and second color components. The quantization parameters for second color components are determined for example using a determination method according to embodiments of the present invention as described later with reference to FIG. 4. The coefficients of the quantized transformed residual are then coded by means of an entropy coding performed by the module 209 and then inserted in the compressed bit stream 210. Coding syntax elements are also coded with help of the module 209. As will be explained more in detail with reference to FIG. 5, these coding syntax elements can comprise parameters that indicate the functions used to get the quantization parameters. The processing module 209 uses spatial dependencies between syntax elements to increase the coding efficiency.

In order to calculate the Intra predictors or to make an estimation of the motion for the Inter predictors, the encoder performs a decoding of the blocks already encoded by means of a decoding loop implemented by the modules 211, 212, 213, 214, 215. This decoding loop makes it possible to reconstruct the blocks and images from the quantized transformed residuals.

Thus the quantized transformed residual is dequantized by the module 211 by applying the inverse quantization to the one provided by the module 208 and reconstructed by the module 212 by applying the inverse transform to the one performed by the module 207.

If the residual comes from an Intra coding module 217, the used Intra predictor is added to this residual in order to recover a reconstructed block corresponding to the original block modified by the losses resulting from a transformation with loss, here quantization operations.

If the residual on the other hand comes from an Inter coding module 218, the blocks pointed to by the current motion vectors (these blocks belong to the reference images 215 referred by the current image indices) are merged then added to this decoded residual. In this way the original block is modified by the losses resulting from the quantization operations.

A final loop filter processing module 219 is applied to the reconstructed signal in order to reduce the effects created by heavy quantization of the residuals obtained and to improve the signal quality. In the current HEVC standard, 2 types of loop filters are used: deblocking filter 213 and sample adaptive offset (SAO) 220.

The deblocking filter 213 may use deblocking quantization parameters obtained by applying the same function(s) than those applied for determining the quantifization parameter(s) for the second color component(s) used by the quantization module 208.

The filtered images, also called reconstructed images, are then stored as reference images 215 in order to allow the subsequent Inter predictions taking place during the compression of the following images of the current video sequence. It is possible to use several reference images 215 for the estimation and motion compensation of the current image.

The resulting bit stream 210 of the encoder 20 is also composed of a set of NAL units that corresponds to parameter sets and coding slices.

Figure 3:
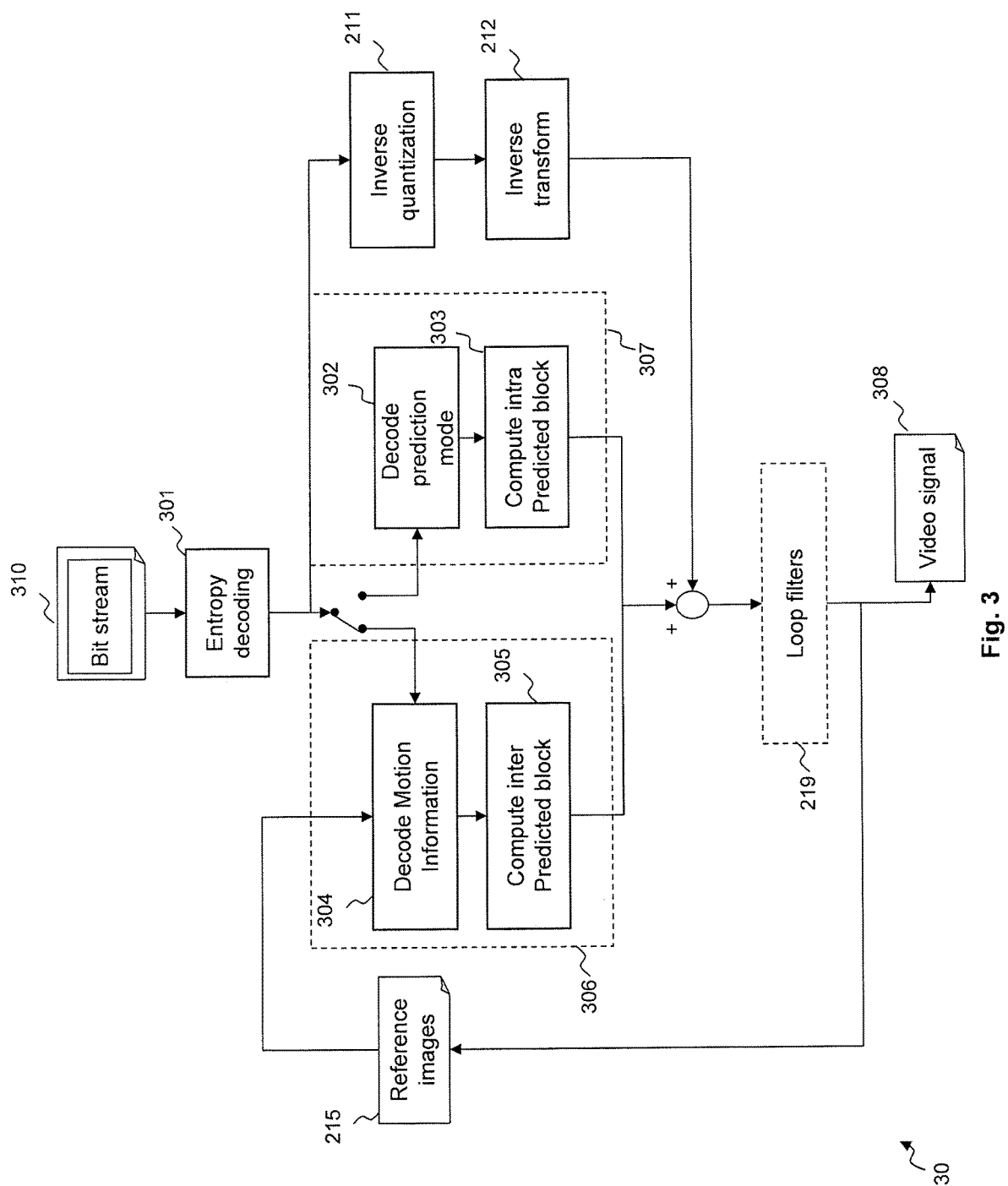
FIG. 3 shows a simplified block diagram showing an example of an decoding device according to one particular embodiment of the invention.

FIG. 3 shows a global diagram of a classical video decoder 30 of HEVC type. The decoder 30 receives as an input a bit stream 210 corresponding to a video sequence 201 compressed by an encoder of the HEVC type, like the one in FIG. 2.

Such decoder can implement a decoding method according to embodiments of the present invention, as described later with reference to FIG. 6.

During the decoding process, the bit stream 210 is first of all parsed with help of the entropy decoding module 301. This processing module uses the previously entropy decoded elements to decode the encoded data. It decodes in particular the parameter sets of the video sequence to initialize the decoder and also decode the Coding Tree Units (CTUs, also named LCU) of each video frame. Each NAL unit that corresponds to coding slices or entropy slices are then decoded. The parsing process that uses modules 301, 302 and 304 can be done in parallel for each slice but block prediction processes module 305 and 303 and loop filter module must be sequential to avoid issue of neighbor data availability.

The partition of the CTU is parsed and CU, PU and TU subdivision are identified. The decoder is successively processing each CU is then performed with help of intra (307) and inter (306) processing modules, inverse quantization and inverse transform modules and finally loop filter processing module (219).

The Inter or Intra prediction mode for the current block is parsed from the bit stream 210 with help of the parsing process module 301. Depending on the prediction mode, either intra prediction processing module 307 or inter prediction processing module 306 is employed. If the prediction mode of the current block is Intra type, the intra prediction mode is extracted from the bit stream and decoded with help of neighbours prediction mode module 302 of intra prediction processing module 307. The intra predicted block is then computed in the module 303 with the decoded intra prediction mode and the already decoded pixels at the boundaries of current PU. The residual associated with the current block is recovered from the bit stream 210 and then entropy decoded.

If the prediction mode of the current block indicates that this block is of Inter type, the motion information is extracted from the bit stream 210 and decoded by the module 304. AMVP process is performed by the modules 304 and 305. Motion information of neighbours PU already decoded are also used to compute the motion vector of current PU. This motion vector is used in the reverse motion compensation module 305 in order to determine the Inter predictor block contained in the reference images 215 of the decoder 30. In a similar manner to the encoder, these reference images 215 are composed of images that precede the image currently being decoded and that are reconstructed from the bit stream (and therefore decoded previously).

Next decoding step consists in decoding the residual block that has been transmitted in the bit stream. The parsing module 301 extracts the residual coefficients from the bit stream and performs successively the inverse quantization (in the module 211) and inverse transform (module 212) to obtain the residual block.

In particular, the inverse quantization is performed using quantization parameters for the first and second color components determined for example using a determination method according to embodiments of the present invention as described later with reference to FIG. 4. In such determination, the functions to be used to get the quantization parameters for second color components can be indicated by parameters included as syntax elements in the bit stream during the encoding.

This residual block is added to the predicted block obtained at output of intra or inter processing module.

At the end of the decoding of all the blocks of the current image, the loop filter processing module 219 is used to eliminate the block effects and improve the signal quality in order to obtain the reference images 215. As done at the encoder, this processing module employs the deblocking filter 213, then SAO 220 filter.

The deblocking filter 213 may use deblocking quantization parameters obtained by applying the same function(s) than those applied for determining the dequantifization parameter(s) for the second color component(s) used by the dequantization or inverse quantization module 211.

The images thus decoded constitute the output video signal 308 of the decoder, which can then be displayed and used.

FIG. 4 shows the general steps of a method of determining the value of a quantization parameter for at least one second color component of an image 102 or image portion (e.g. slice 103) according to embodiments of the invention.

Such method can be implemented by an encoding device or a decoding device such as those described with reference to FIGS. 2 and 3, in order to get quantization parameters for the quantization of the coefficients derived from pixel values by a transform (for instance OCT or DST) calculated for example by the module 207, or for the dequantization of symbols obtained by the entropy decoding of encoded symbols.

As explained above, there is a link between the quantization parameters applied to the first color component QPY, and the quantization parameters applied to the second color components QPC. That link can consist in an intermediate value QPI based on QPY and which is calculated at step 410, using for example the following equation:

$$QPI=\text{MAX}(-QPBd\text{OffsetC},\text{MIN}(57,QPY+QPOffsetC))$$

wherein:

QPBdOffsetC is a pre-defined offset depending on the bit-depth used to represent the second color component, QPY is the value of the quantization parameter of the first color component of the image or image portion, and QPOffsetC is an offset that enables to partly control the link between QPC and QPY.

When the method is implemented by an encoding device, the quantization parameter QPY for the first color component is usually provided by a user.

However, when the quantization is performed on data received by a decoder, that is, when the method is implemented by a decoding device, the quantization parameter QPY is included into the bit stream.

As a reminder, several color formats are supported by the Range Extension of HEVC: 4:4:4 YUV color format, 4:2:2 YUV color format and 4:2:0 YUV color format. Obviously, there exist other color formats.

Generally, a function is associated with a color format. Such function is able to associate with each intermediate value QPI, a value of quantization parameter for the second color component QPC. Generally, these functions are represented as correspondence tables as Tables 1 (corresponding to 4:2:0 YUV), 2 (corresponding to 4:2:2 YUV) and 3 (corresponding to 4:4:4 YUV) shown above.

The present invention aims to improve the flexibility of the Range Extension in allowing the switching between the different functions. In other terms, it is now possible, given a current color format (e.g. 4:2:2 YUV), to use a function associated with a color format (e.g. 4:2:0 YUV or 4:4:4 YUV) different from the current color format.

To do so, there is provided a selection step 420 where one or several functions are selected so as to be applied to the intermediate value QPI and to determine the quantization parameter for the second color component QPC.

Back to the example of Tables 1, 2 and 3 shown above, it can be noticed that Table 3 (corresponding to 4:4:4 YUV) is quite simple since it corresponds to a clipped version of QPI: QPC=MIN(QPI, 51). However, Table 2 (corresponding to 4:2:2 YUV) contains specific values that cannot be deduced from Table 1 (corresponding to 4:2:0 YUV) or from Table 3.

One or two of these tables can be selected during step 420. For example, when the current color format is 4:2:2 YUV, Table 3 associated with 4:4:4 YUV, which is simpler, can be selected instead of Table 2.

In an illustrative example, when the current color format is 4:2:2 YUV, Table 1 associated with 4:2:0 YUV and Table 3 associated with 4:4:4 YUV can be selected instead of Table 2.

That selection step 420 is particularly interesting if the memory is limited and if only a limited number of functions are available. For instance, one can avoid storing the values of Table 2 but only the values of Table 1 and Table 3, in order to save memory. In that case, it is possible that the current color format does not correspond to those of an available function, but the selection step 420 allows that case to be handled since it provides a sort of systematic switching toward available functions.

To this end, an available function can be designated to be used by default when there is no available function associated with the current color format.

In a variant, the function(s) can be selected according to a parameter, given by a user or within a bunch of syntax elements in case the determination method is performed by a decoder (see FIG. 5 below).

When the functions are selected, they are applied to the intermediate value QPI in order to determine at step 430, a value of the quantization parameter QPC for the second color component.

For example, if two functions F1 and F3 have been selected, the QPC can be determined as follows:

$$QPC=\text{IntegerValueOf}(F1(QPI)+F3(QPI)+R)/2$$

wherein R is a rounding offset equal to 0 or 1, and can be fixed or depends on the intermediate value QPI. For instance, R=0 when QPI<44 and otherwise R=1.

The determined QPC and the QPY are then used in a quantization or dequantization operation by an encoder or a decoder.

FIG. 5 shows the general steps of a method of encoding an image 102 or image portion (e.g. slice 103) according to embodiments of the invention.

Such method can be implemented by an encoding device such as the one described with reference to FIG. 2.

It is to be noted that since an image 102 or image portion 103 is represented by a first component and at least one second color component divided into coding units CUs, the present encoding method consists in encoding all the coding units of the image 102 or image portion 103.

Such encoding method comprises determining (at step 510) the value of a quantization parameter QPC for at least one second color component, for example by applying the method (steps 410, 420 and 430) described above with reference to FIG. 4.

The determined QPCs are then used with QPY to encode the successive coding units into encoded data ENC(Data). That step 520 comprises quantizing first and second color components using the corresponding quantization parameters. In particular, the first color component is quantized using the quantization parameter QPY and the at least one second color component is quantized using the determined quantization parameters QPC.

At step 530, a bit stream 210 of the encoded data ENC(Data) is generated. The encoded data comprise the quantization parameter QPY for the first color component.

In some embodiments, the generation step 530 comprises inserting a parameter as a syntax element, that indicate the functions used at step 510 to get the quantization parameters.

The parameter can be associated with a specific image, thus included in a PPS NAL unit.

In a variant, the parameter can be associated with a sequence of images, thus included in a SPS NAL unit.

For example, the syntax for a SPS NAL unit seq_parameter_set_rbsp( ) including such a parameter called chroma_table_idc may be represented as follows:

```
seq parameter set rbsp( ) {
    ...
    chroma format idc
    if( chroma format idc = = 3 )
        separate colour plane flag
```

```
    if( ChromaArrayType > 1 )
        chroma table idc
    ...
}
``` wherein:

chroma_format_idc specifies the color format of the incoming bit stream:
  0 for monochrome content (i.e. only one color component),
  1 for 4:2:0 YUV color format,
  2 for 4:2:2 YUV color format,
  3 for 4:4:4 YUV color format.

separate_colour_plane_flag when equal to 1 specifies that each component is independently coded as a monochrome component.

chroma_table_idc specifies the function (here the table) used to determine the quantization parameter(s) QPC for the second color component(s) from the quantization parameter QPY for the first color component:
  0: the 4:2:0 YUV table is used,
  1: the 4:2:2 YUV table is used,
  2: the 4:4:4 YUV table is used.

In an embodiment, when there are fewer available functions (tables) than possible color formats, for example only 4:2:0 YUV and 4:4:4 YUV tables are available, the syntax for a SPS NAL unit seq_parameter_set_rbsp( ) including such a parameter called chroma_420_table_not_used_flag may be represented as follows:

```
sea parameter set rbsp( ) {
    ...
    chroma format idc
    if( chroma format idc = = 3 )
        separate colour plane flag
    if( ChromaArrayType > 1 )
        chroma 420 table_not used_flag
    ...
}
``` wherein:

chroma_format_idc specifies the color format of the incoming bit stream:
  0 for monochrome content (i.e. only one color component),
  1 for 4:2:0 YUV color format,
  2 for 4:2:2 YUV color format,
  3 for 4:4:4 YUV color format.

separate_colour_plane_flag when equal to 1 specifies that each component is independently coded as a monochrome component.

chroma_420_table_not_used_flag when equal to 0 specifies that the 4:2:0 YUV table is used by default to determine the quantization parameter(s) QPC for the second color component(s) from the quantization parameter QPY for the first color component. When equal to 1, this parameter specifies that the other table (i.e. 4:4:4 YUV) is used by default to determine the quantization parameter(s) QPC for the second color component(s) from the quantization parameter QPY for the first color component. In a variant, by default (that is when it is not present in the bitstream), chroma_420_table_not_used_flag is set equal to 0.

In another variant, the parameter can be associated with a slice, thus incorporated in the header of the slice.

Wherever the parameter is inserted, it is received by the decoder into the bit stream 210.

In an embodiment, the two tables are specified as follows:

| chroma_420_not_used_flag = 0 | QPI | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|---|
| | QPC | = QPI | 29 | 30 | 31 | 32 | 33 | 33 | 34 | 34 | 35 | 35 | 36 | 36 | 37 | 37 | = QPI − 6 |

| chroma_420_not_used_flag = 1 | QPI | <51 | ;::51 |
|---|---|---|---|
| | QPC | = QPI | 51 |

FIG. 6 shows the general steps of a method of decoding an image 102 or image portion (e.g. slice 103) according to embodiments of the invention.

Such method can be implemented by a decoding device such as the one described with reference to FIG. 3.

The decoder receives encoded data, for example encoded according to an encoding method such as the one described above with reference to FIG. 5, comprising the quantization parameter QPY for the first color component, and decodes the encoded data at step 610.

At step 620, the value of quantization parameters QPC for at least one second color component is determined, for example by applying the method (steps 410, 420 and 430) described above with reference to FIG. 4, in which the function(s) for determining quantization parameters for second color components are selected (step 420) based on the corresponding parameter (respectively chroma_table_idc and chroma_420_table_not_used_flag in the preceding examples) included within the bit stream 210 during the encoding (see FIG. 5).

In a variant, the decoder can be configured so that a function associating QPI with QPC is designated by default when there is no available function associated with the current color format.

At step 630, the decoded image or image portion is reconstructed from the decoded data. The reconstruction comprises dequantizing the first and second color components of the image or image portion by using the quantization parameters of first and second color components determined at step 620.

In particular, the first color component is dequantized using the quantization parameter QPY included in the decoded data and the at least one second color component is dequantized using the determined quantization parameters QPC.

The selected function is further used in the deblocking filter to determine the deblocking quantization parameter.

Finally in an embodiment an improved flexibility is provided by allowing the selection of the function(s) used to determinate the quantization parameters for the second color components. Furthermore, depending on the function finally selected, either that improvement does not imply a diminution of the coding performance, or in case there is a noticeable loss in one of the components, that loss is generally compensated by a comparable gain in the other components.

In particular, as an example, when a different quality balance is targeted between the color components (e.g. a weaker luma and stronger chroma components), and that the current color format is 4:4:4 YUV or 4:2:2 YUV, the inventors have found that it is particularly interesting to select a function associated with the 4:2:0 YUV color format instead of using a function associated with 4:4:4 YUV or 4:2:2 YUV color formats.

Furthermore, this improved flexibility makes it possible to store only certain functions in memory, since another function than the one associated with the current color format, can be selected to determine the QPC.

The preceding examples are only possible embodiments of the invention, which is not limited thereto.

The invention claimed is:

1. A method of encoding an image or an image portion comprising:
   determining data indicative of a color format;
   determining a value of QPC which is a quantization parameter for at least one chroma component of an image or an image portion by using the following function for 4:4:4 color format and 4:2:2 color format to obtain the value of QPC from a value of QPI which is an intermediate quantization parameter when the data does not indicate 4:2:0 color format,
   QPC=MIN(QPI, 51),
   the value of QPI being based on a value of a quantization parameter for a luma component of the image or the image portion,
   and using a different function from the above function to obtain the value of QPC from the value of QPI when the data indicate 4:2:0 color format; and
   using the determined value of QPC to encode the image or the image portion.

2. The method according to claim 1, wherein said function is used when the data indicates either 4:2:2 or 4:4:4 color format without separate encoding of color components.

3. The method according to claim 1, wherein said different function is

| QPI | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QPC | = QPI | 29 | 30 | 31 | 32 | 33 | 33 | 34 | 34 | 35 | 35 | 36 | 36 | 37 | 37 | = QPI − 6. |

4. The method according to claim 1, wherein the image or the image portion represented by a luma component and at least one chroma component forms part of an image sequence, said luma and chroma components being divided into coding units, and the method further comprises:
   encoding the successive coding units into encoded data, the encoding comprising quantizing the luma and the or one chroma component of the image or the image portion by using the quantization parameters for luma and chroma color components, and
   generating a bit stream of said encoded data.

5. A method of decoding an image or an image portion comprising:
   determining data indicative of a color format;
   determining a value of QPC which is a quantization parameter for at least one chroma component of an image or an image portion to be decoded by using the following function for 4:4:4 color format and 4:2:2 color format to obtain the value of QPC from a value of QPI which is an intermediate quantization parameter when the data does not indicate 4:2:0 color format,

QPC=MIN(QPI, 51), the value of QPI being based on a value of a quantization parameter for a luma component of the image or the image portion, and using a different function from the above function to obtain the value of QPC from the value of QPI when the data indicate 4:2:0 color format; and using the determined value of QPC to decode the image or the image portion.

6. The method according to claim 5, wherein said function is used when the data indicates either 4:2:2 or 4:4:4 color format without separate encoding of color components.

7. The method according to claim 5, wherein said different function is

| QPI | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QPC | = QPI | 29 | 30 | 31 | 32 | 33 | 33 | 34 | 34 | 35 | 35 | 36 | 36 | 37 | 37 | = QPI − 6. |

8. The method according to claim 5, wherein the image or the image portion represented by a luma component and at least one chroma component forms part of an image sequence, said luma and chroma components being divided into coding units, and the method further comprises receiving encoded data related to the image or the image portion to decode, decoding the encoded data, reconstructing the decoded image or the decoded image portion from the decoded data, the reconstructing comprising dequantizing the luma and the or one chroma components of the image or the image portion by using the quantization parameters for the luma and chroma components.

9. A non-transitory computer readable carrier medium comprising processor executable code for performing a method of encoding an image or an image portion comprising:

determining data indicative of a color format;

determining a value of QPC which is a quantization parameter for at least one chroma component of an image or an image portion by using the following function for 4:4:4 color format and 4:2:2 color format to obtain the value of QPC from a value of QPI which is an intermediate quantization parameter when the data does not indicate 4:2:0 color,

QPC=MIN(QPI, 51), the value of QPI being based on a value of a quantization parameter for a luma component of the image or the image portion, and using a different function from the above function to obtain the value of QPC from the value of QPI when the data indicate 4:2:0 color format; and using the determined value of QPC to encode the image or the image portion.

10. A non-transitory computer readable carrier medium comprising processor executable code for performing a method of decoding an image or an image portion comprising:

determining data indicative of a color format;

determining a value of QPC which is a quantization parameter for at least one chroma component of an image or an image portion to be decoded by using the following function for 4:4:4 color format and 4:2:2 color format to obtain the value of QPC from a value of QPI which is an intermediate quantization parameter when the data does not indicate 4:2:0 color format,

QPC=MIN(QPI, 51), the value of QPI being based on a value of a quantization parameter for a luma component of the image or the image portion, and using a different function from the above function to obtain the value of QPC from the value of QPI when the data indicate 4:2:0 color format; and using the determined value of QPC to decode the image or the image portion.

11. A device for encoding an image or an image portion comprising:

a determining unit configured to determine data indicative of a color format, and determine a value of QPC which is a quantization parameter for at least chroma component of an image or an image portion using the following function for 4:4:4 color format and 4:2:2 color format to obtain the value of QPC from a value of QPI which is an intermediate quantization parameter when the data does not indicate 4:2:0 color format,

QPC=MIN(QPI, 51), the value of QPI being based on a value of a quantization parameter for a luma component of the image or the image portion, and using a different function from the above function to obtain the value of QPC from the value of QPI when the data indicate 4:2:0 color format; and an encoding unit configured to use the determined value of QPC to encode the image or the image portion.

12. The device according to claim 11, wherein the image or the image portion represented by a luma component and at least one chroma component forms part of an image sequence, said luma and chroma components being divided into coding units, wherein the encoding unit is configured to encode the successive coding units into encoded data, the encoding comprising quantizing the luma and the or one second color component of the image or the image portion by using the quantization parameters for luma and chroma color components, and the device further comprises a generating unit configured to generate a bit stream of said encoded data.

13. A device for decoding an image or an image portion comprising:

a determining unit configured to determine data indicative of a color format, and determine a value of QPC which is a quantization parameter for at least one chroma component of an image or an image portion to be decoded using the following function for 4:4:4 color format and 4:2:2 color format to obtain the value of QPC from a value of QPI which is an intermediate quantization parameter when the data does not indicate 4:2:0 color format,

QPC=MIN(QPI, 51), the value of QPI being based on a value of a quantization parameter for a luma component of the image or the image portion, and using a different function from the above function to obtain the value of QPC from the value of QPI when the data indicate 4:2:0 color format; and a decoding unit configured to use the determined value of QPC to decode the image or the image portion.

14. The device according to claim 13, wherein the image or the image portion represented by a luma component and at least one chroma component forms part of an image sequence, said luma and chroma components being divided into coding units, and the device further comprises:

a receiving unit for receiving encoded data related to the image or the image portion to decode, wherein the decoding unit is configured to decode the encoded data, and a reconstructing unit configured to reconstruct the decoded image or the decoded image portion from the decoded data, the reconstructing comprising dequantizing the luma and the or one chroma components of the image or the image portion by using the quantization parameters for the luma and chroma components.

15. A method of encoding an image or an image portion comprising:

determining data indicative of a color format;

determining a value of QPC which is a quantization parameter for at least one chroma component of an image or an image portion by using a first function for 4:4:4 color format and 4:2:2 color to obtain the value of QPC from a value of QPI which is an intermediate quantization parameter when the data does not indicate 4:2:0 color format, the value of QPC being equal to the value of QPI when the first function is used and the value of QPI is less than a fixed value, and the value of QPC being the fixed value when the first function is used and the value of QPI is equal to or greater than the fixed value, the value of QPI being based on a value of a quantization parameter for a luma component of the image or the image portion, and using a second function different from the first function to obtain the value of QPC from the value of QPI when the data indicate 4:2:0 color format; and using the determined value of QPC to encode the image or the image portion.

16. A method of decoding an image or an image portion comprising:

determining data indicative of a color format;

determining a value of QPC which is a quantization parameter for at least one chroma component of an image or an image portion to be decoded by using a first function for 4:4:4 color format and 4:2:2 color format to obtain the value of QPC from a value of QPI which is an intermediate quantization parameter when the data does not indicate 4:2:0 color format, the value of QPC being equal to the value of QPI when the first function is used and the value of QPI is less than a fixed value, and the value of QPC being the fixed value when the first function is used and the value of QPI is equal to or greater than the fixed value, the value of QPI being based on a value of a quantization parameter for a luma component of the image or the image portion, and using a second function different from the first function to obtain the value of QPC from the value of QPI when the data indicate 4:2:0 color format; and using the determined value of QPC to decode the image or the image portion.

17. A non-transitory computer readable carrier medium comprising processor executable code for performing a method of encoding an image or an image portion comprising:

determining data indicative of a color format;

determining a value of QPC which is a quantization parameter for at least one chroma component of an image or an image portion by using a first function for 4:4:4 color format and 4:2:2 color format to obtain the value of QPC from a value of QPI which is an intermediate quantization parameter when the data does not indicate 4:2:0 color, the value of QPC being equal to the value of QPI when the first function is used and the value of QPI is less than a fixed value, and the value of QPC being the fixed value when the first function is used and the value of QPI is equal to or greater than the fixed value, the value of QPI being based on a value of a quantization parameter for a luma component of the image or the image portion, and using a second function different from the first function to obtain the value of QPC from the value of QPI when the data indicate 4:2:0 color format; and using the determined value of QPC to encode the image or the image portion.

18. A non-transitory computer readable carrier medium comprising processor executable code for performing a method of decoding an image or an image portion comprising:

determining data indicative of a color format;

determining a value of QPC which is a quantization parameter for at least one chroma component of an image or an image portion to be decoded by using a first function for 4:4:4 color format and 4:2:2 color format to obtain the value of QPC from a value of QPI which is an intermediate quantization parameter when the data does not indicate 4:2:0 color format, the value of QPC being equal to the value of QPI when the first function is used and the value of QPI is less than a fixed value, and the value of QPC being the fixed value when the first function is used and the value of QPI is equal to or greater than the fixed value, the value of QPI being based on a value of a quantization parameter for a luma component of the image or the image portion, and using a second function different from the first function to obtain the value of QPC from the value of QPI when the data indicate 4:2:0 color format; and using the determined value of QPC to decode the image or the image portion.

19. A device for encoding an image or an image portion comprising:

a determining unit configured to determine data indicative of a color format, and determine a value of QPC which is a quantization parameter for at least chroma component of an image or an image portion using a first function for 4:4:4 color format and 4:2:2 color format to obtain the value of QPC from a value of QPI which is an intermediate quantization parameter when the data does not indicate 4:2:0 color format, the value of QPC being equal to the value of QPI when the first function is used and the value of QPI is less than a fixed value, and the value of QPC being the fixed value when the first function is used and the value of QPI is equal to or greater than the fixed value, the value of QPI being based on a value of a quantization parameter for a luma component of the image or the image portion, and using a second function different from the first function to obtain the value of QPC from the value of QPI when the data indicate 4:2:0 color format; and an encoding unit configured to use the determined value of QPC to encode the image or the image portion.

20. A device for decoding an image or an image portion comprising:

a determining unit configured to determine data indicative of a color format, and determine a value of QPC which is a quantization parameter for at least one chroma component of an image or an image portion to be decoded using a first function for 4:4:4 color format and 4:2:2 color format to obtain the value of QPC from a value of QPI which is an intermediate quantization parameter when the data does not indicate 4:2:0 color format, the value of QPC being equal to the value of QPI when the first function is used and the value of QPI is less than a fixed value, and the value of QPC being the fixed value when the first function is used and the value of QPI is equal to or greater than the fixed value, the value of QPI being based on a value of a quantization parameter for a luma component of the image or the image portion, and using a second function different from the first function to obtain the value of QPC from the value of QPI when the data indicate 4:2:0 color format; and a decoding unit configured to use the determined value of QPC to decode the image or the image portion.

* * * * *